United States Patent [19]

Ohyama

[11] Patent Number: 4,626,086
[45] Date of Patent: Dec. 2, 1986

[54] REAR VIEW MIRROR ASSEMBLY

[75] Inventor: Yasuo Ohyama, Toyota, Japan

[73] Assignee: Toyota Jidosha Kabushiki Kaisha, Japan

[21] Appl. No.: 756,950

[22] Filed: Jul. 19, 1985

[30] Foreign Application Priority Data

Jul. 23, 1984 [JP] Japan ............................ 59-111270[U]

[51] Int. Cl.$^4$ ................................................ G02B 7/18
[52] U.S. Cl. .................................... 350/632; 248/549;
248/481; 296/84 B; 403/2
[58] Field of Search ......................... 350/632, 635, 639;
248/549, 481–484, 900, 467; 296/84 B; 403/2

[56] References Cited

U.S. PATENT DOCUMENTS

| 3,425,657 | 2/1969 | Doyle. | |
|---|---|---|---|
| 3,471,115 | 10/1969 | Corbin. | |
| 3,575,375 | 4/1971 | Strem, Jr.. | |
| 3,887,156 | 6/1975 | Hugonnier | 248/549 |
| 3,928,894 | 12/1975 | Bury et al. | 248/467 |
| 4,012,022 | 3/1977 | Tomita | 248/549 |
| 4,254,931 | 3/1981 | Aikens et al.. | |

FOREIGN PATENT DOCUMENTS

| 528543 | 10/1954 | Belgium | 248/481 |
|---|---|---|---|
| 2410388 | 9/1975 | Fed. Rep. of Germany | 296/84 B |
| 2233826 | 1/1975 | France | 296/84 B |
| 2264685 | 10/1975 | France | 296/84 B |
| 5824595 | 5/1983 | Japan | 350/632 |
| 2048803 | 12/1980 | United Kingdom | 248/467 |

Primary Examiner—Jon W. Henry
Attorney, Agent, or Firm—Parkhurst & Oliff

[57] ABSTRACT

This invention relates to a rear view mirror assembly which can break away, when more then a predetermined force is applied to a rear view mirror. The rear view mirror assembly includes a base member and a first unit. The first unit includes a mounting member, a second socket member and a support arm on which the rear view mirror is rotatably mounted. The mounting member is mounted on the base member, and the mounting member has a first ball portion. The support arm has a first socket portion on an outer surface thereof, and the first socket portion is slidably mounted on the first ball portion of the mounting member. The support arm further includes a second ball portion on an inner surface thereof, and the inner surface is slidably mounted on the second socket member. The first unit is supported on the base member through a bolt and a spring. When a force is applied to the rear view mirror, the support arm can rotate on the mounting member and the first unit can rotate on the base member.

21 Claims, 9 Drawing Figures

REAR VIEW MIRROR ASSEMBLY

BACKGROUND OF THE INVENTION

The present invention relates to a rear view mirror assembly of a vehicle, and more particularly to improvements in a universally adjustable device disposed between a base member and a support arm of the rear view mirror assembly.

The following U.S. patent applications are contemporaneous with this application and disclose rear view mirror assemblies:

U.S. patent application Ser. No. 756,953, filed July 19, 1985;

U.S. patent application Ser. No. 756,952, filed July 19, 1985; and

U.S. patent application Ser. No. 756,827, filed July 19, 1985. The disclosure of each of the above-identified applications is herein incorporated by reference.

An adjustable device disposed between a base member and a support arm of a rear view mirror is disclosed in Japanese Utility Model Laid-open No. Showa 58-24595. In this Japanese Utility Model Laid-open No. Showa 58-24595, the rear view mirror includes a support arm, a spring and a base member. The base member is cemented on an interior of a windshield, and includes a bar and a mounting portion. The spring includes a hooked end and a rear edge, and the hooked end being mounted on the bar of the base member. The rear edge of the spring is disposed on the mounting portion, and the support arm is fixed on the spring by a bolt.

Further, the base member includes a slanted surface on a bottom surface thereof and the support arm includes an incline on an end thereof. As shown in FIG. 12 of Japanese Utility Model Laid-open No. Showa 58-24595, when a force "Pc" is applied to the rear view mirror, the support arm is moved downwardly and breaks away, because the incline of the support arm and the slanted surface of the base member prevent the support arm from resisting the force "Pc".

Furthermore, this rear view mirror assembly includes a spherical ball portion disposed on an opposite end of the support arm, the ball portion being received within a socket portion of the rear view mirror.

Therefore, this rear view mirror can be adjusted to its angle through the spherical ball portion and the socket portion of the rear view mirror. However, the range of the adjustment of this rear view mirror is rather small, because this rear view mirror includes only one adjustment device.

Another adjustment device disposed between a windshield header and a support arm of a rear view mirror is disclosed in U.S. Pat. No. 3,575,375.

In this U.S. Pat. No. 3,575,375, the rear view mirror assembly includes a first adjustment device and a second adjustment device. The first adjustment device includes a clamping plate and a spherical ball on one end of the support arm. The second adjustment device includes a stud assembly mounted on an opposite end of the support arm. The rear view mirror is mounted on the stud. Thus, this rear view mirror assembly can be adjusted to a wide range of angular positions by the first adjustment device and the second adjustment device.

Further, the ball on the support arm has a V-shaped notch so that the support arm can break away from the clamping plate when an excessive force is applied to the rear view mirror by rotating the support arm about the spherical ball. However, during assembly, it is necessary for a worker to pay attention to the desired distance between a mounting bracket for the entire assembly and the clamping plate, because the support arm cannot break away when a less than desired distance is defined between the mounting bracket and the clamping plate. It is further noted that the support arm cannot mount on the windshield header when a greater than desired distance is defined between a mounting bracket and the clamping plate. Thus, the device disclosed in the '375 patent is relatively difficult to assemble.

A rear view mirror having an adjustment device which is disposed between a body member of a vehicle and the rear view mirror is disclosed in U.S. Pat. No. 3,471,115. This adjustment device includes a semi-spherical socket portion and a spring. The semi-spherical socket portion engages frictionally with a ball end of a support arm for the rear view mirror, and a spring biases the ball end into engagement with the semi-spherical socket portion. The rear view mirror can move universally about the adjustment device when a force is applied thereto. However, the rear view mirror cannot break away from its mounting bracket under an excessive force because the support arm of the rear view mirror is connected to the mounting bracket through the spring.

U.S. Pat. No. 3,425,657 discloses a rear view mirror assembly having a ball and socket joint. The ball includes a plurality of projections mating within grooves in the socket. The rear view mirror assembly, however, cannot break away from the windshield.

SUMMARY OF THE INVENTION

The present invention has been developed in view of the foregoing background and to overcome the foregoing drawbacks. It is accordingly an object of this invention to provide a rear view mirror assembly which is able to break away from a windshield, when more than a predetermined amount of a force is applied to the rear view mirror assembly in all directons of the rear view mirror.

It is another object of the invention to provide a rear view mirror assembly which is able to be adjusted universally to a wide range of angular positions.

Further, it is another object of the invention to provide a rear view mirror assembly which is relatively easier to assemble by enabling a worker to disregard a distance which is defined between a second ball member and a spring of the rear view mirror assembly, when the rear view mirror assembly is installed on the windshield.

In order to accomplish the above-described objects, a rear view mirror assembly according to the present invention includes a base member and a first unit of the rear view mirror assembly. The first unit of the rear view mirror assembly includes a mounting member, a spring, a support arm, a second ball member, a bolt and a rear view mirror. The base member is preferably cemented to a windshield of a vehicle, and the base member has a hook and a mounting portion thereon.

The mounting member is disposed on the mounting portion of the base member, and includes a first socket portion and a first aperture thereon. The first aperture is opened in the first socket portion. The spring is mounted on the hook of the base member, and the spring has an engagement device. The support arm includes an outer surface and an inner surface on an end thereof. The outer surface of the support arm is slidably mounted on the first socket portion of the mounting member, and the inner surface of the support arm includes a second socket portion. A second aperture is opened in both of the second socket portion of the inner surface and the outer surface. The rear view mirror is rotatably mounted on an opposite end of the support arm.

The second ball member is slidably mounted on the second socket portion of the support arm, and the second ball member is connected to an end of the bolt. The bolt is inserted into the second aperture of the support arm and the first aperture of the mounting member, and the other end of the bolt is engaged with the engagement device of the spring.

Therefore, the components of the first unit of the rear view mirror assembly are united. The spring of the first unit of the rear view mirror assembly can support a predetermined amount of the downward vertical force on the hook of the base member, so that the first unit of the rear view mirror assembly can break away from the base member, when more than the predetermined amount of the downward vertical force is applied thereto.

Further, the engagement device of the spring has an inner end therein, so that the inner end prevents the bolt from being inserted more than a predetermined length. Therefore, a length defined between the engagement device and the second ball member is constant. Accordingly, it is not necessary of a worker to pay any attention to the length during assembly.

A diameter of the second aperture of the support arm is longer than a diameter of both the first aperture of the mounting member, so that the support arm can rotate about the bolt, and the support arm is capable of being universally adjusted to any angle in a wide range of angles.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF THE PREFERRED EMBODIMENTS

The present invention will be described in detail with reference to the accompanying drawings which illustrate different embodiments according to the present invention.

Figure 1:
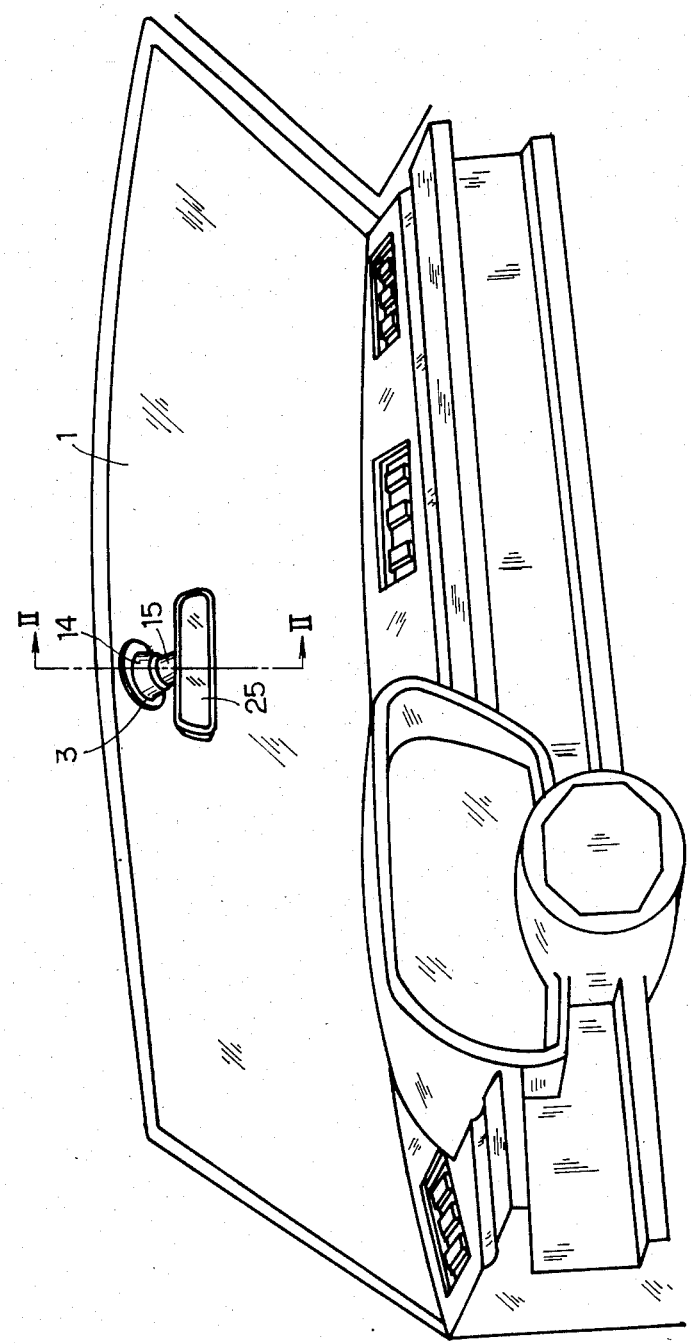
FIG. 1 is a perspective view showing a rear view mirror assembly according to the present invention.

Referring to FIG. 1, a rear view mirror assembly is disposed at an upper central portion of a windshield 1 of a vehicle. A rear view mirror 25 is rotatably mounted on an inner surface of the windshield 1 through a support arm 15, a mounting member 14 and a first base member 3.

Figure 2:
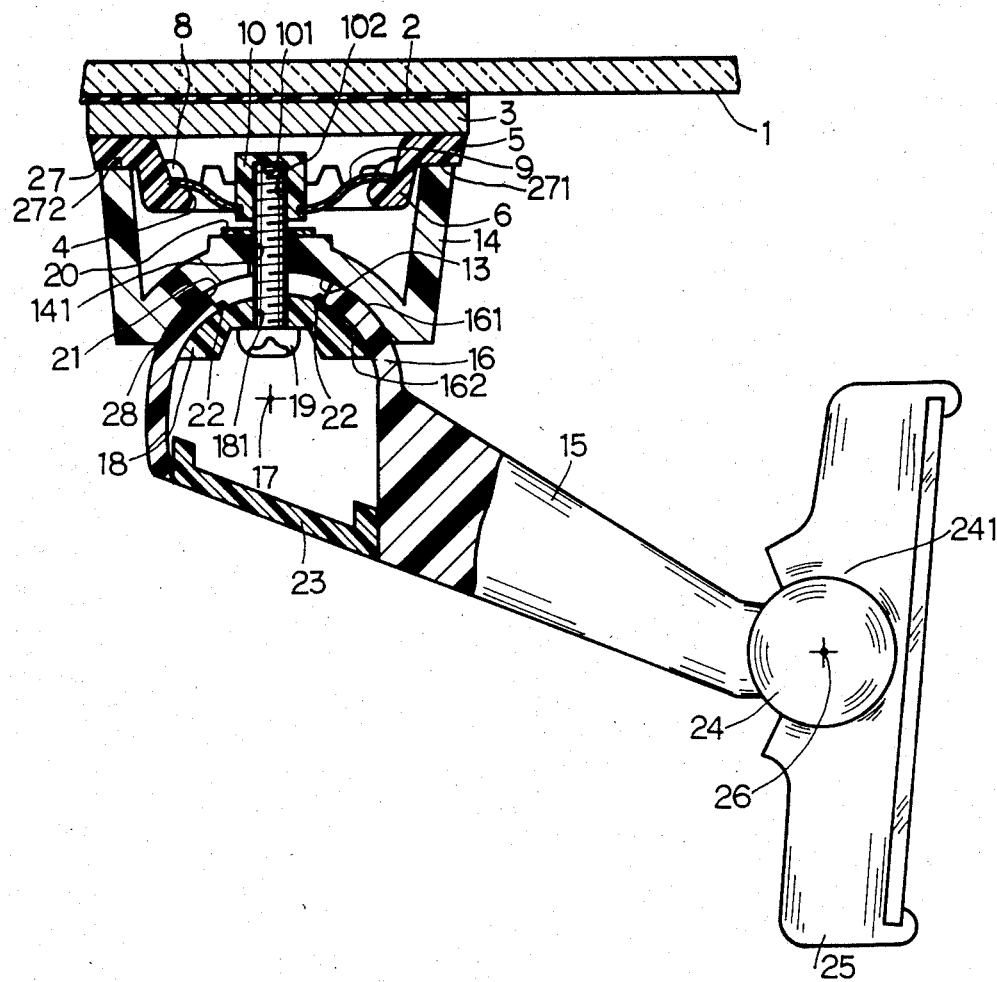
FIG. 2 is an enlarged cross-sectional view of the rear view mirror assembly of a first embodiment, taken along the line II—II in FIG. 1.
Figure 3:
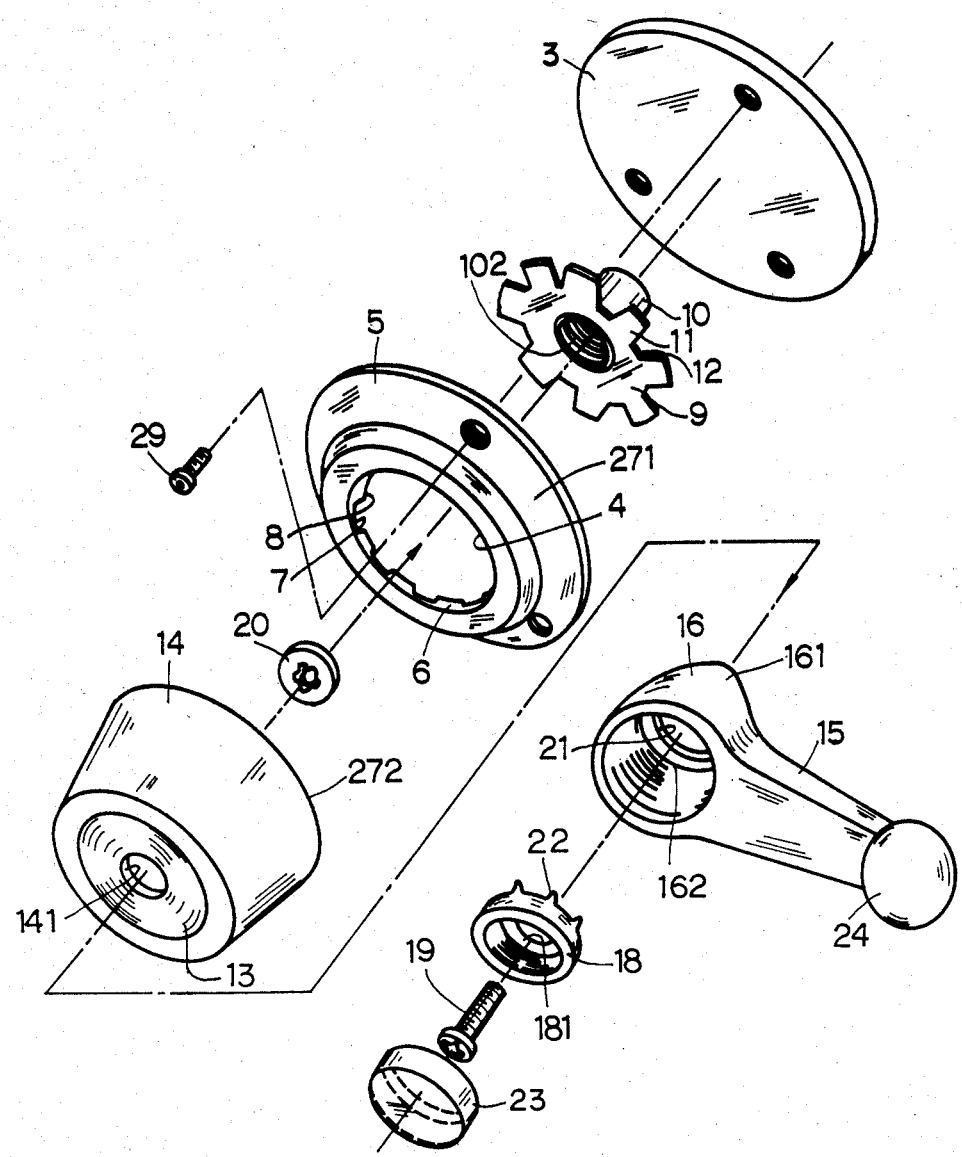
FIG. 3 is an enlarged perspective view showing components of the rear view mirror assembly shown in FIG. 1 in a disassembled condition.

As shown in FIG. 2 and FIG. 3, the first base member 3 is cemented by an adhesive 2 to the windshield 1. The first base member 3 includes a plurality of screw holes therein, and a second base member 5 is fixed on the first base member 3 by a corresponding plurality of screws 29.

The second base member 5 includes a mounting portion 271 which is disposed in the vicinity of an outer peripheral edge thereof, and is on a substantially flat horizontal surface. A hook 6 extends from an inner portion of the mounting portion 271. The hook 6 has an inner peripheral edge and an upper surface, the inner peripheral edge defining an opening 4 within the second base member 5. The upper surface of the hook 6 has a plurality of second projections 8 and a plurality of second recesses 7 thereon.

A spring 9 is defined within the opening 4 of the second base member 5. The spring 9 includes a cap 10, a plurality of first projections 11 and a plurality of first recesses 12. The cap 10 is fixed at a central portion of the spring 9, and includes a cavity 102 with an inner end 101 therein. The cavity 102 of the cap 10 includes a screw hole therein.

The plurality of first projections 11 of the spring 9 extend outwardly in its radial direction, and engage with the plurality of second recesses 7 of the second base member 5. Therefore, the spring 9 engages securely with the second base member 5, so that the spring 9 cannot rotate in the opening 4 of the second base member 5. Further, the spring 9 can support a predetermined amount of a downward vertical force so that the spring 9 can break away from the hook 6, when more than the predetermined amount of the downward vertical force is applied to the spring 9.

The mounting member 14 is disposed on the mounting portion 271 of the second base member 5. The mounting member 14 includes an upper peripheral edge 272 and a first socket portion 13. The upper peripheral edge 272 is in contact with the mounting portion 271 of the second base member 5, and the first socket portion 13 of the mounting member 14 is formed in a lower surface of the mounting member 14. The first socket portion 13 is formed in a semi-spherical concave shape, and has a first aperture 141 at the central portion of the mounting member 14.

The support arm 15 is pivotally mounted on the first socket portion 13 of the mounting member 14. The support arm 15 has an opposite end 24. The end 16 of the support arm 15 includes an outer surface and an inner surface. The outer surface of the support arm 15 has a first ball portion 161 thereon formed in a semi-spherical convex shape. The first ball portion 161 is mounted on the first socket portion 13 of the mounting member 14. The inner surface of the support arm 15 includes a second socket portion 162 which is formed in a semi-spherical concave shape. The inner surface of the support arm 15 defines a recess within the end 16 of the support arm 15, and a second aperture 21 is opened between the second socket portion 162 of the inner surface of the support arm 15 and the first ball portion 161 on the outer surface of the support arm 15. The second aperture 21 has an inner peripheral edge.

A curved or second ball member 18 having an upper semi-spherical convex surface is slidably mounted on the second socket portion 162 of the supporting arm 15. The second ball member 18 has a third aperture 181 and a plurality of protrusions 22 on its convex surface. Preferably, at least three protrusions 22 are disposed on the upper semi-spherical convex surface. The protrusions 22 are normally located within the inner peripheral edge of the second aperture 21.

A bolt 19 is provided for securing the various components together. The bolt 19 includes a head portion on an end thereof adjacent the second ball member 18. The opposite end of the bolt 19 is inserted into the cavity 102 in the cap 10 of the spring 9. An intermediate shank portion of the bolt 19 extends through the third aperture 181 of the second ball member 18, the second aperture 21 of the support arm 15, and the first aperture 141 of the mounting member 14. A diameter of the second aperture 21 is greater than the diameter of the first aperture 141 and the third aperture 181, so that the support arm 15 is supported for universal movement. That is, the support member 15 can rotate about the vertical axis of the bolt 19 (FIG. 2), the protrusions 22 rotating within the second aperture 21. The support member 15 can also rotate about a central point 17 (FIG. 2) of the support arm 15 to an extent defined by the inner peripheral edge of the second aperture 21. Rotation about the central point 17 requires the inner surface of the support arm 15 to ride over the protrusions 22.

It should be apparent to one skilled in the art that the bolt 19 may be a screw or a rod.

The opposite end of the bolt 19 is prevented from being inserted into the cavity 102 of the cap 10 more than a predetermined length by the inner end 101 of the cap 10, so that a bolt length defined between the cap 10 and the head portion of the bolt 19 is constant. The bolt length between the cap 10 and the head portion of the bolt 19 is greater than a sum of the thicknesses of the mounting member 14 around the first aperture 141, the supporting arm 15 around the second aperture 21, and the second ball member 18 around the third aperture 181. Therefore, the support 15 can move along the longitudinal axis of the bolt 19, as well as rotating about a central portion 17 of the support arm 15.

It will be apparent to one skilled in the art that the bolt 19 may be integral with the second ball member 18.

The recess of the support arm 15 opens downward in a lower portion of the support arm 15, and a cover 23 is disposed within the recess. Therefore, the cover 23 covers the recess and improves the aesthetic appearance of the rear view mirror assembly.

The opposite end of the support arm 15 includes a ball portion 24, and the ball portion 24 formed in a spherical ball shape. The ball portion 24 is rotatably received in a spherical socket portion 241 which is defined within the rear view mirror 25.

A first unit of the rear view mirror assembly includes the bolt 19, the spring 9, the mounting member 14, the support arm 15 and the second ball member 18. In the first unit of the rear view mirror assembly, the bolt 19 unites the spring 9, the mounting member 14, the support arm 15 and the second ball member 18. When more than the predetermined amount of the downward vertical force is applied to the spring 9, the first unit of the rear view mirror assembly can break away from the second base member 5.

A washer 20 is disposed between the cap 10 and the mounting member 14. Preferably, the washer 20 is made of synthetic resin. The washer 20 includes a hole therein which is slightly smaller than a diameter of the bolt 19. Therefore, the washer 20 prevents the bolt 19 from moving easily in the hole of the washer 20, once the bolt 19 is inserted into the hole of the washer 20. Further, the washer 20 and the bolt 19 can unite the mounting member 14, the support arm 15 and the second ball member 18, and then these components make up a second unit of the rear view mirror assembly. During assembly, the second unit (i.e., mounting member 14, support arm 15 and second ball member 18, all of which are united by the bolt 19 and the washer 20) is attached to the spring 9 by threading the bolt 19 into the cop 10. The assembly of the second unit with the spring 9 forms the first unit. The spring 9 may be inserted within the second base member 5 when the second unit is attached to the spring.

As shown in FIG. 2, the plurality of protrusions 22 of the second ball member 18 are normally disposed in the second aperture 21 of the support arm 15, so that the plurality of protrusions 22 normally prevent the rotation of the support arm 15 about the central point 17. Therefore, it is convenient for a worker to install the second unit of the rear view mirror assembly on the spring 9, because these components of the second unit cannot change their positions due to the interlocked relation between the protrusions 22 and the second aperture 21 of the support arm 15. That is, the insertion of the protrusions 22 within the second aperture 21 temporarily maintains the components in position during assembly. As noted above, once assembled, the inner surface of the support arm 15 can ride over the protrusions 22 to permit rotation about the central point 17.

Description will be hereunder given of operation of the above-described embodiment.

Figure 4:
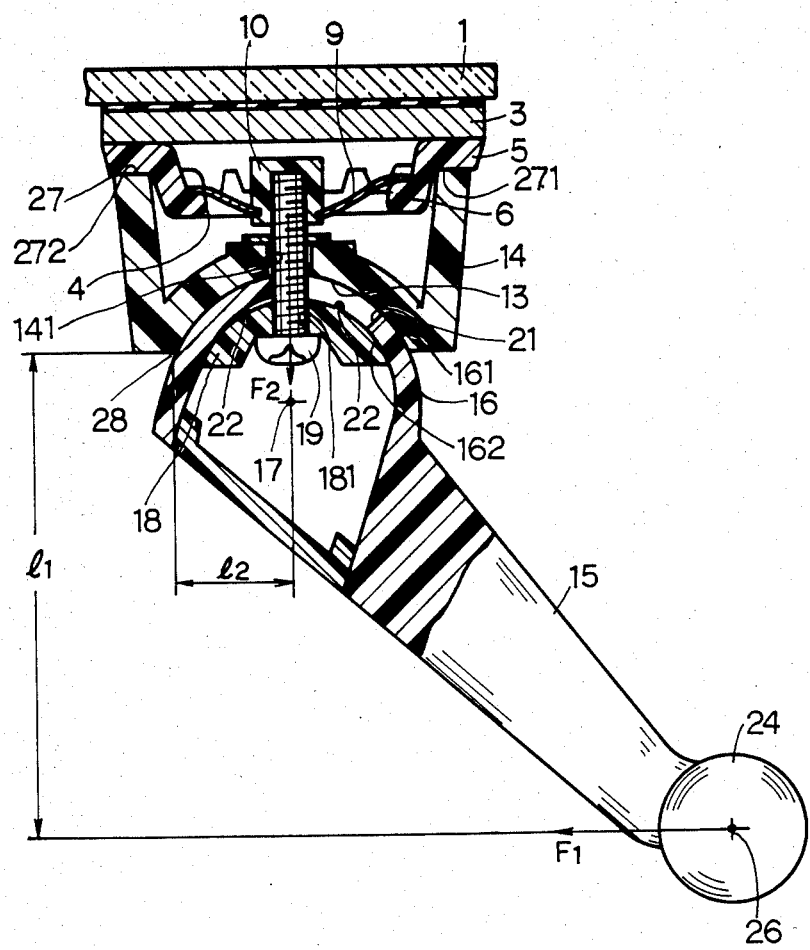
FIG. 4 is a cross-sectional view of the rear view mirror assembly of FIG. 2, which shows the support arm rotated about a central rotational point 17 of the rotation of the support arm in the clockwise direction in FIG. 2, when a force "$F_1$" is applied to the support arm in the horizontal direction in FIG. 2.

As shown in FIG. 4, the inner surface of the support arm 15 can ride on the protrusion 22 of the second ball member 18, when a force "$F_1$" is applied to a central point 26 of the ball end 24 of the support arm 15. As a result of the force "$F_1$", the support arm 15 rotates about a central point 17 of the support arm 15. The intermediate shank portion of the bolt 19 limits the movement of the support arm 15 to rotate within a space defined by the second aperture 21. That is, the inner peripheral edge of the second apertur 21 contacts the intermediate shank portion of the bolt 19 and thus limits the rotation of the support arm 15 about the central point 17.

When the force "$F_1$" is continuously applied to the support arm 15 in the horizontal direction in FIG. 4, a first moment $M_1$ in the clockwise direction about a point 28 is calculated by a first formula (1) as follows:

$$M_1 = l_1 \cdot F_1 \tag{1}$$

In this first formula (1), $l_1$ is a vertical length between the point 28 and the central point 26 of the ball end 24 for the rear view mirror 25. The point 28 is defined between the first ball portion 161 of the support arm 15 and an edge of the first socket portion 13 of the mounting member 14.

A second moment "$M_2$" in the clockwise direction about point 28 in FIG. 4 is calculated by the second formula (2) as follows:

$$M_2 = l_2 \cdot F_2 \tag{2}$$

In the second formula (2), $l_2$ is the horizontal length between point 28 and the bolt 19, and "$F_2$" is a downward vertical force on the bolt 19. The resiliency of the spring 9 resists the force "$F_2$".

For equilibrium, $M_1$ must equal $M_2$. Therefore, the downward vertical force "$F_2$" along the bolt 19, which is applied in the spring 9, is calculated by a third formula (3) as follows:

$$F_2 = (l_1/l_2) \cdot F_1 \tag{3}$$

Figure 5:
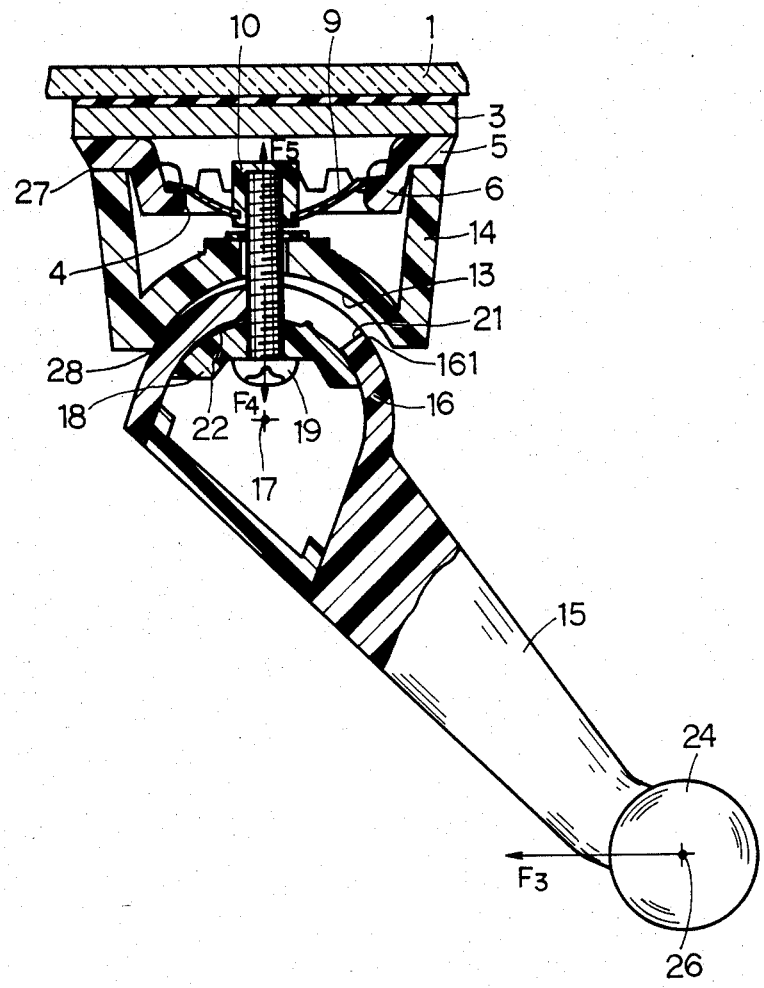
FIG. 5 is a cross-sectional view of the rear view mirror assembly of FIG. 2, which shows the support arm rotated about the central point 17 of the rotation of the support arm in the clockwise direction in an amount greater than the condition which is shown in FIG. 4.

In FIG. 5, a force "$F_3$" is applied to the central point 26 and a downward vertical force "$F_4$" is applied to the spring 9. If the force "$F_3$" is larger than the force "$F_1$", and a force "$F_4$" is not larger than the predetermined downward vertical force, the support arm 15 is further rotated about the point 28. The first ball portion 161 of the support arm 15 separates partially from the first socket portion 13 of the mounting member 14, and the support arm 15 is supported by the spring 9. In this condition, the force "$F_4$" is balanced with a bias force "$F_5$" of the spring 9 so that the moments generated about the point 28 are equal. The force "$F_4$" is calculated by a fourth formula (4) as follows:

$$F_4 = (l_1/l_2) \cdot F_3 \tag{4}$$

Next, if the force "$F_3$" becomes larger, and the force "$F_4$" becomes larger than the predetermined amount of the downward vertical force, the spring 9 can break away from the hook 6 of the second base member 5. Concurrently the first unit of the rear view mirror assembly can break away when the spring 9 separates from the hook 6.

Figure 6:
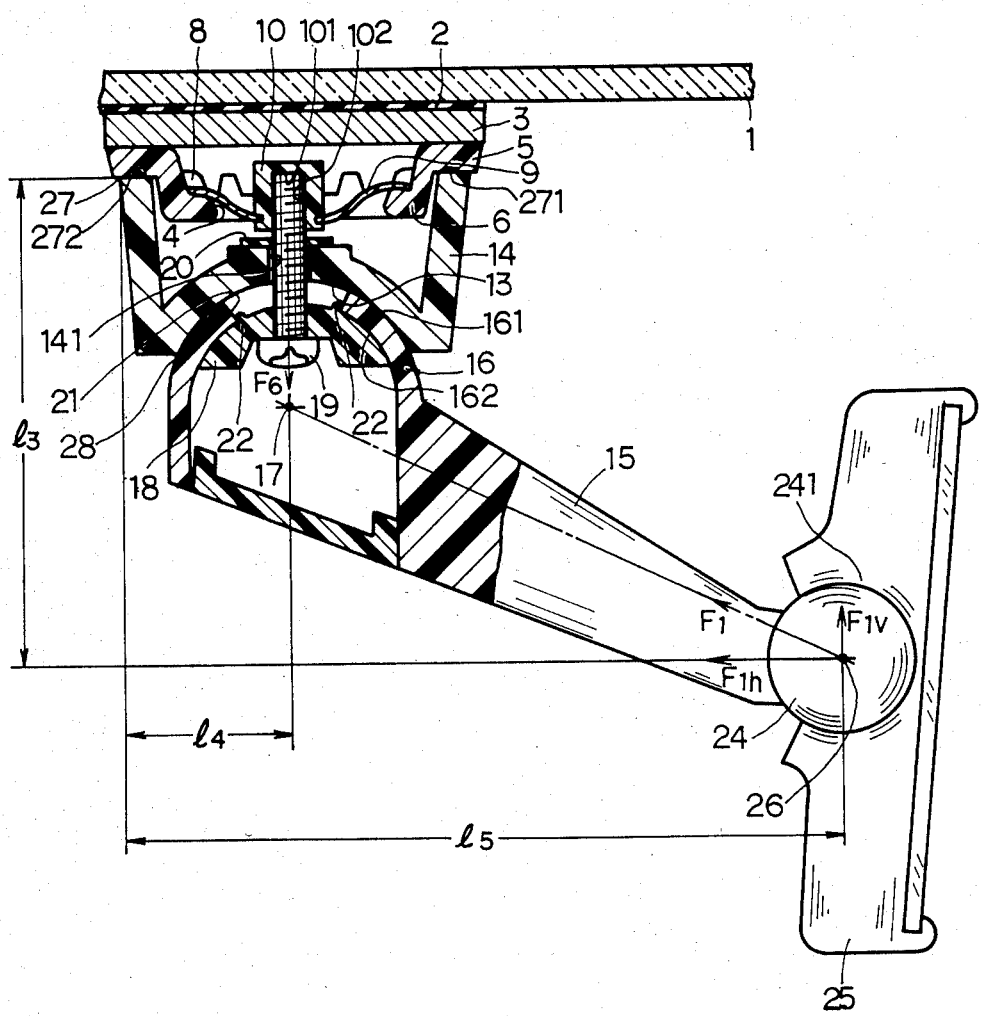
FIG. 6 is a cross-sectional view of the rear view mirror assembly of FIG. 2, which shows the force "$F_1$" applied to the support arm along the line connecting the central point 17 of the rotation of the support arm to a central point for of the rotation of the rear view mirror.

As shown in FIG. 6, when the force "$F_1$" is applied to the support arm 15 along the line which connects the central point 26 to the central point 17 of the support arm 15, the support arm 15 cannot be rotated about the central point 17.

However, the vertical and horizontal components $F_{1v}$, $F_{1h}$ of the force $F_1$ cause a third moment $M_3$ in the clockwise direction about a point 27, the point 27 being defined between the mounting portion 271 of the second base member 5 and the upper edge 272 of the mounting member 14. The third moment $M_3$ in the clockwise direction about the point 27 is calculated by a fifth formula (5) as follows:

$$M_3 = l_3 \cdot F_{1h} - l_5 \cdot F_{1v} \tag{5}$$

In this fifth formula (5), $l_3$ is a vertical length between the point 27 and the central point 26 of the rotation of the rear view mirror 25, and $l_5$ is a horizontal length between the point 27 and the point 26.

Figure 7:
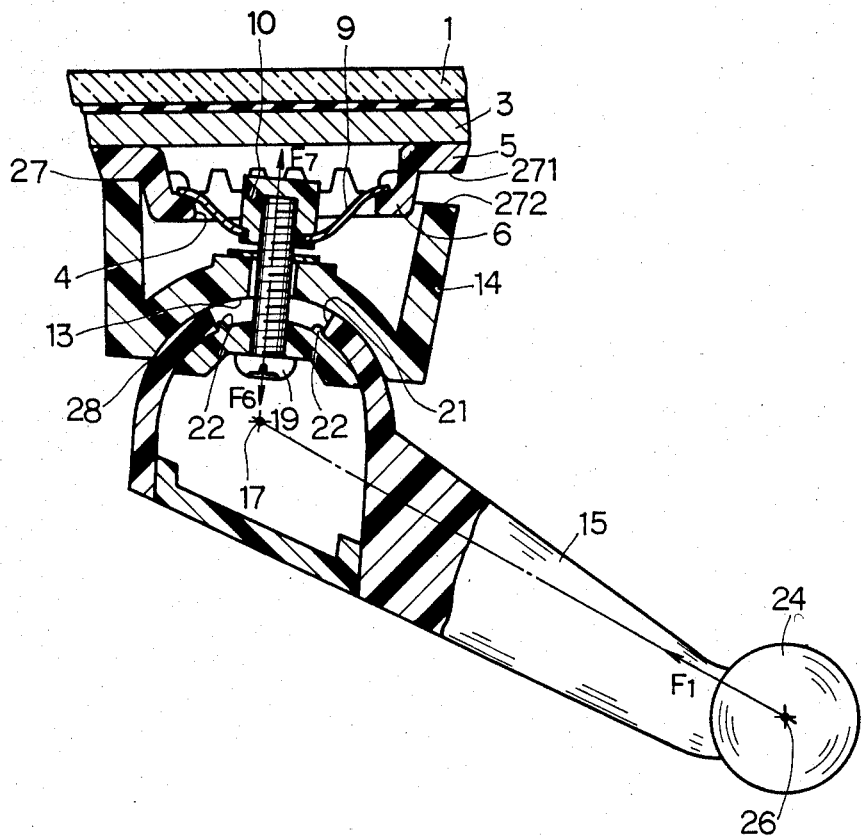
FIG. 7 is a cross-sectional view of the rear view mirror assembly of FIG. 2, which shows the support arm rotated about a contact point 27 between a mounting member and a base member in the clockwise direction.

Therefore, as shown in FIG. 7, the support arm 15 and the mounting member 14 can be rotated about the point 27, so that the upper edge 272 of the mounting member 14 separates partially from the mounting portion 271 of the second base member 5. In this case, both of the support arm 15 and the mounting member 14 are supported by the spring 9. In FIG. 7, a downward vertical force "$F_6$" along the bolt 19 generates a fourth moment $M_4$ in the clockwise direction about the point 27. The fourth moment $M_4$ is calculated by the following sixth formula (6):

$$M_4 = F_6 \cdot l_4 \tag{6}$$

In this sixth formula (6), $l_4$ is a horizontal length between the point 27 and the bolt 19.

If $M_3$ equals $M_4$, then the force $F_6$ along the bolt 19 is balanced with a bias force "$F_7$" of the spring 9 and calculated by a seventh formula (7) as follows:

$$F_6 = (l_3 \cdot F_{1h} - l_5 \cdot F_{1v})/l_4 = F_7 \tag{7}$$

Next, if the force "$F_1$" increases and the force "$F_6$" becomes larger than the predetermined amount of the downward vertical force, the spring 9 can break away from the hook 6 of the second base member 5. Therefore, the first unit of the rear view mirror assembly can break away.

Figure 8:
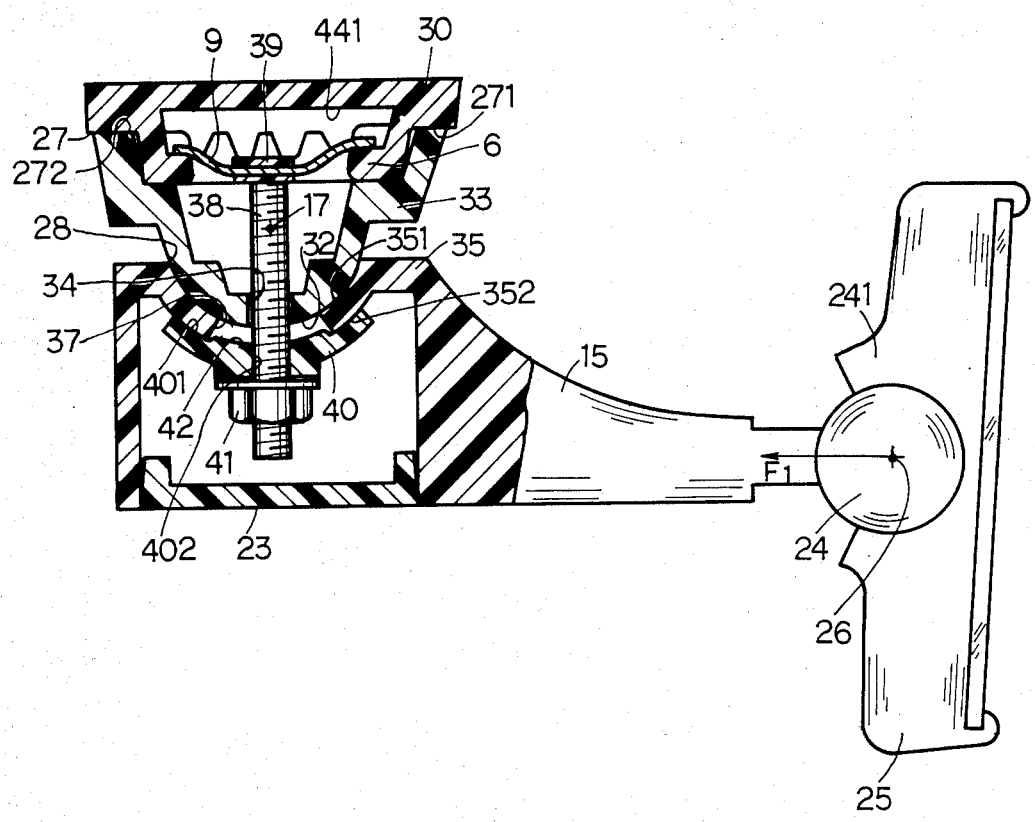
FIG. 8 is an enlarged cross-sectional view of the rear view mirror assembly of a second embodiment, taken along the line II—II in FIG. 1.

A second embodiment of a rear view mirror assembly is shown in FIG. 8. The second embodiment is similar to the first embodiment disclosed in FIG. 2. However, the second embodiment has several differences disclosed hereunder.

A third base member 30 includes a cavity 441 defined therewithin. A spring 9 is disposed within the cavity 441 of the third base member 30, and is mounted on a hook 6 of the third base member 30. The spring 9 includes a base plate 39 at a central portion thereof. A bolt 38 extends downwardly from the base plate 39 of the spring 9, and the bolt 38 has a screw thread thereon.

A mounting member 33 includes a third ball portion 32 at a lower surface thereof, and a fourth aperture 34 therein. The fourth aperture 34 is opened in the third ball portion 32, and the bolt 38 is inserted into the fourth aperture 34. The third ball portion 32 of the mounting member 33 is formed in a semi-spherical convex shape.

A support arm 15 includes an end 35 having an outer surface and an inner surface thereof. A third socket portion 351 is formed on the outer surface of the support arm 15, and the third socket portion 351 is slidably mounted on the third ball portion 32 of the mounting member 33. The third socket portion 351 of the support arm 15 is formed in a semi-spherical socket concave shape, and a fifth aperture 37 is opened in the third socket portion 351 of the support arm 15. A diameter of the fifth aperture 37 of the support arm 15 is greater than a diameter of the fourth aperture 34 of the mounting member 33, and the bolt 38 is inserted into the fifth aperture 37 of the support arm 15. A fourth ball portion 352 is formed in the inner surface of the support arm 15, and has a semi-spherical convex shape. The fifth aperture 37 is opened in the fourth ball portion 352 of the support arm 15.

A fourth socket member 40 is mounted on the fourth ball portion 352 of the support arm. The fourth socket member 40 includes an upper semi-spherical concave surface 401 thereon and a sixth aperture 402 which is opened in the upper semi-spherical concave surface 401 thereof. A diameter of the sixth aperture 402 of the fourth socket member 40 is smaller than the diameter of the fifth aperture 37 of the support arm 15, and the bolt 38 is inserted into the sixth aperture 402 of the fourth socket member 40, so that the support arm 15 can rotate about the bolt 38 within a space defined between the third ball portion 32 of the mounting member 33 and the upper semi-spherical concave surface 401 of the fourth socket member 40.

A nut 41 is mounted on a lower surface of the fourth socket member 40, and the nut 41 engages with the screw thread of the bolt 38. Therefore, the nut 41 can support the fourth socket member 40, the support arm 15 and the mounting member 33 on the hook 6 of the third base member 30 through the bolt 38 and the spring 9.

A first unit of the rear view mirror assembly includes the fourth socket member 40, the support arm 15, the mounting member 33, the spring 9 and the bolt 38.

Further, the fourth socket member 40 includes a second protrusion 42 on the upper semi-spherical concave surface 401 thereof, and the second protrusion 42 is disposed around the sixth aperture 402 of the fourth socket member 40. The second protrusion 42 of the fourth socket member is normally disposed within the fifth aperture 37 of the support arm 15, so that the support arm 15 cannot rotate easily about a central point 17 of a rotation of the support arm 15. However, the fourth ball portion 352 of the support arm 15 can ride over the second protrusion 42 of the fourth socket member 40, when a force "$F_1$" is applied to the support arm 15.

Figure 9:
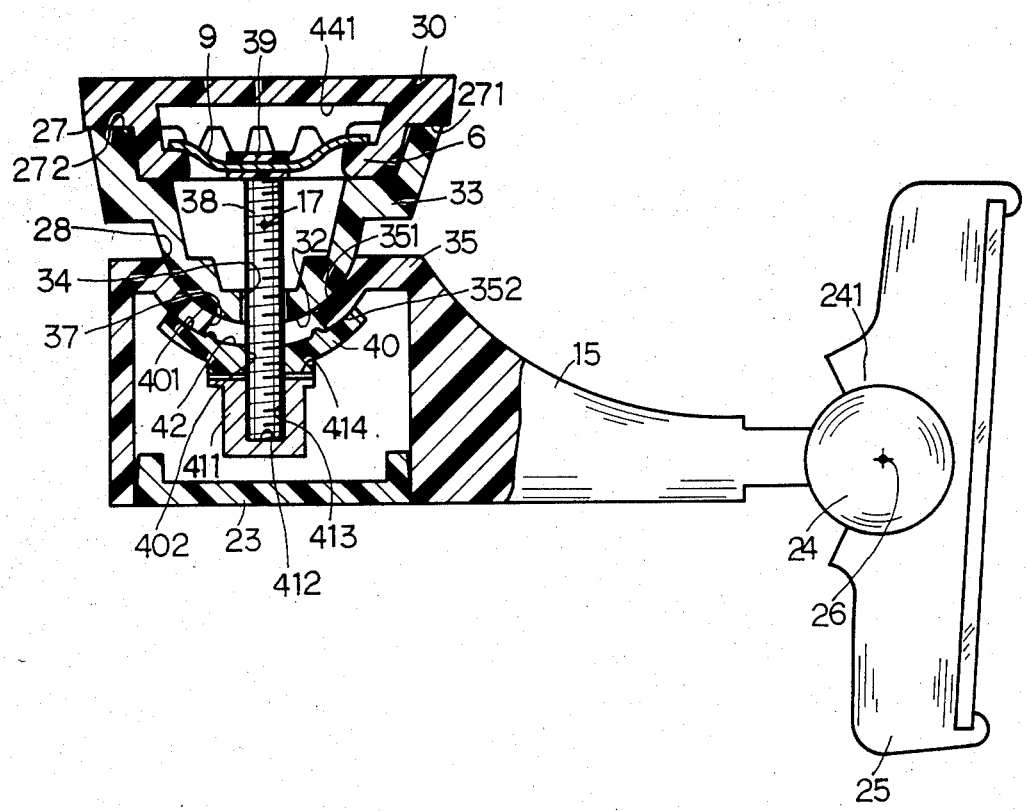
FIG. 9 is an enlarged cross-sectional view of the rear view mirror assembly of a third embodiment, taken along the line II—II in FIG. 1.

A third embodiment of a rear view mirror assembly is shown in FIG. 9. The third embodiment is substantially similar to the second embodiment disclosed in FIG. 8. However, the major difference between the second embodiment and the third embodiment is a nut 411.

The nut 411 includes a cavity 413 and an inner end 412, and the cavity 413 is defined within the nut 411. The nut 411 has a screw hole therein, and a bolt 38 is inserted into the cavity 413. The inner end 412 of the nut 411 prevents a bolt 38 from being inserted into the nut 411 more than a predetermined length, so that a length defined between an upper surface of the nut 411 and a base plate 39 of a spring 9 is constant. Therefore, a bias force which is normally caused on the spring 9 is constant, and the nut 411 can support a fourth socket member 40, a support arm 15 and a mounting member 33 on a hook 6 of a third base member 30 through the spring 9 and the bolt 38. A first unit of the rear view mirror assembly includes the spring 9, the mounting member 33, the support arm 15, the fourth socket member 40, the nut 411 and the bolt 38.

As described herein, the present invention overcomes the shortcomings of the known art by providing a first unit of the rear view mirror assembly which can break away, when a force is applied to the rear view mirror in all directions of the rear view mirror. Further, assembly is facilitated by forming the components into a second sub-unit which is attached to the spring to form the first unit.

While the present invention has been described in its preferred embodiments, it is to be understood that the invention is not limited thereto, and may be otherwise embodied within the scope of the following claims.

What is claimed is:

1. A rear view mirror assembly of a vehicle comprising:
    a base member secured to a surface of the vehicle, the base member having a hook and a mounting portion thereon; and
    a first unit of the rear view mirror assembly comprising,
        a mounting member having a first end located on the mounting portion of said base member, the mounting member having a first aperture and a first socket portion disposed around the first aperture, the first socket portion disposed on a second end of said mounting member opposite from said first end,
        a spring member mounted on the hook of said base member and having an engaging means thereon, the spring member being able to support a force on the hook of said base member,
        a support arm having a first end with an outer surface and an inner surface, and an opposite second end which rotatably supports a rear view mirror,
            the outer surface of said first end of said support arm mounted slidably on the first socket portion of said mounting member,
            the inner surface of said support arm having a second socket portion,
        a second aperture extending from the second socket portion of the inner surface to the outer surface of the support arm, a diameter of the second aperture of said support arm being greater than a diameter of the first aperture of said mounting member,
        a second ball member mounted slidably on the second socket portion of said support arm, and
        an engagement member inserted into the second aperture of said support arm and the first aperture of said mounting member, the engagement member having one end engaging the engagement means of said spring member, and an opposite end connected to said second ball member, the engagement member uniting said second ball member, said support arm and said mounting member on said base member through said spring member,
        whereby said first unit of the rear view mirror assembly is universally mounted on said base member, and said first unit of the rear view mirror assembly may disengage from said hook of said base member, when more than the predetermined amount of force is applied thereto.

2. The rear view mirror assembly as set forth in claim 1, wherein the hook of said base member is disposed on an inner peripheral edge of said base member for defining an opening therewithin, and said spring member of said first unit of the rear view mirror assembly is inserted into the opening of said base member.

3. The rear view mirror assembly as set forth in claim 2, wherein the hook of said base member includes a plurality of second projections and a plurality of second recesses on a surface of the hook of said base member.

4. The rear view mirror assembly as set forth in claim 3, wherein said spring member includes a plurality of first projections and a plurality of first recesses, the plurality of first projections of said spring member engaging the plurality of the second recesses of the hook of said base member.

5. The rear view mirror assembly as set forth in claim 4, wherein the engagement member is a screw threadably engaged within a cavity of a cap disposed at a central portion of said spring member.

6. The rear view mirror assembly as set forth in claim 5, wherein the cap of said spring member has an inner end for preventing said screw from being inserted into the cavity of the cap more than a predetermined length.

7. The rear view mirror assembly as set forth in claim 1, further comprising:
washer means for uniting said mounting member, said support arm and said second ball member, said washer means being located between said mounting member and said spring member, the washer means engaging with said engagement member.

8. The rear view mirror assembly as set forth in claim 1, wherein the first socket portion of said mounting member has a generally semi-spherical concave shape.

9. The rear view mirror assembly as set forth in claim 8, wherein the mounting portion of said base member is disposed in the vicinity of an outer peripheral edge of said base member, and said first end of said mounting member has a peripheral edge which mounts on the mounting portion of said base member.

10. The rear view mirror assembly as set forth in claim 9, wherein the outer surface of said support arm has a first ball portion which is mounted slidably on the first socket portion of said mounting member.

11. The rear view mirror assembly as set forth in claim 10, wherein the first ball portion of said support arm has a generally semi-spherical convex shape.

12. The rear view mirror assembly as set forth in claim 11, wherein said support arm further comprises a recess defined within the first end of said support arm, and the second socket portion of said support arm is formed within the recess of said support arm.

13. The rear view mirror assembly as set forth in claim 12, wherein the second socket portion of said support arm has a generally semi-spherical concave shape.

14. The rear view mirror assembly as set forth in claim 13, wherein the second ball member has a generally semi-spherical convex surface thereon.

15. The rear view mirror assembly as set forth in claim 14, wherein the recess of said support arm is covered with a cover which is disposed on a lower surface of said support arm.

16. The rear view mirror assembly as set forth in claim 1, wherein the base member is secured to a windshield of the vehicle.

17. A rear view mirror assembly of a vehicle comprising:
a base member fixed to a windshield of the vehicle, the base member having a hook and a mounting portion thereon; and
a first unit of the rear view mirror assembly comprising,
a mounting member having a first end located on the mounting portion of said base member, the mounting member having a first aperture and a first ball portion disposed around the first aperture, the first ball portion disposed on a second end of the mounting member opposite from the first end,
a spring member detachably engaging said hook and capable of supporting a predetermined amount of a force on the hook of said base member,
a support arm having a first end with an outer surface and an inner surface, and an opposite second end on which a rear view mirror is rotatably mounted,
the outer surface of said support arm mounted slidably on the first ball portion of said mounting member,
the inner surface of said support arm having a second ball portion,
a second aperture extending from the second ball portion of the inner surface to the outer surface of the support arm, a diameter of the second aperture of said support arm being greater than a diameter of the first aperture of said mounting member,
a second socket member mounted slidably on the second ball portion of said support arm,
an engagement member inserted into the second aperture of said support arm and the first aperture of said mounting member, a first end of said engagement member fixed to said spring member, and
an engagement device engaged with a second opposite end of said engagement member, the engagement device mounted on a surface of said second socket member and supporting said second socket member, said support arm and said mounting member on said base member through said spring member and said engagement member,
whereby said first unit of the rear view mirror assembly is universally rotatably mounted on the base member, and said first unit of the rear view mirror assembly may detach from said base member, when more than the predetermined amount of force is applied thereto.

18. The rear view mirror assembly as set for the in claim 17, wherein the first ball portion of said mounting member has a generally semi-spherical convex shape.

19. The rear view mirror assembly as set forth in claim 18, wherein the outer surface of said support arm further includes a first socket portion which is slidably mounted on the first ball portion of said mounting member, and the first socket portion of said support arm has a generally semi-spherical concave shape.

20. The rear view mirror assembly as set forth in claim 19, wherein the second ball portion of said support arm has a generally semi-spherical convex shape.

21. A rear view mirror assembly which can break away from a body member of a vehicle, when more than a predetermined amount of a force is applied to a rear view mirror, said assembly comprising;
a base member fixed on the body member of the vehicle, the base member having a hook and a mounting portion, the hook disposed on an inner peripheral edge thereof, the mounting portion disposed in the vicinity of an outer peripheral edge thereof; and
a first unit of the rear view mirror assembly comprising,
a mounting member having one end disposed on the mounting portion of said base member, the mounting member having a first aperture and a first socket portion located on an opposite end of the mounting member, the first socket portion disposed around the first aperture thereof, a spring member detachably mounting on the hook of said base member, the spring member supporting the predetermined amount of a force, the spring member having a cap, a support arm having a first ball portion, a second aperture and a second socket portion, the first ball portion disposed on an outer surface of a first end of said support arm, the first ball portion mounted slidably on the first socket portion of said mounting member, the second socket portion disposed on an inner surface of the first end of said support arm, the second aperture opened in both of the second socket portion and the first ball portion of said support arm, a diameter of the second aperture being greater than a diameter of the first aperture, a second ball member mounted slidably on the second socket portion of said support arm, the second ball member having a third aperture thereon, a third ball portion disposed on an opposite second end of said support arm, the rear view mirror having a third socket portion disposed thereon, the third socket portion rotatably receiving the third ball portion of said support arm, and an engagement member inserted into the third aperture of said second ball member, the second aperture of said support arm and the first aperture of said mounting member, the engagement member having one end engaging with the cap of said spring member and having a head portion on an opposite end for supporting said second ball member, said support arm and said mounting member on said base member through said spring member, whereby said rear view mirror can rotate on the third spherical ball portion of said support arm, and said support arm can rotate on the first socket portion of said mounting member.

* * * * *